Nov. 24, 1953  P. L. J. GERARD  2,660,485
FLUID SUPPORT
Filed Aug. 8, 1951  2 Sheets-Sheet 2
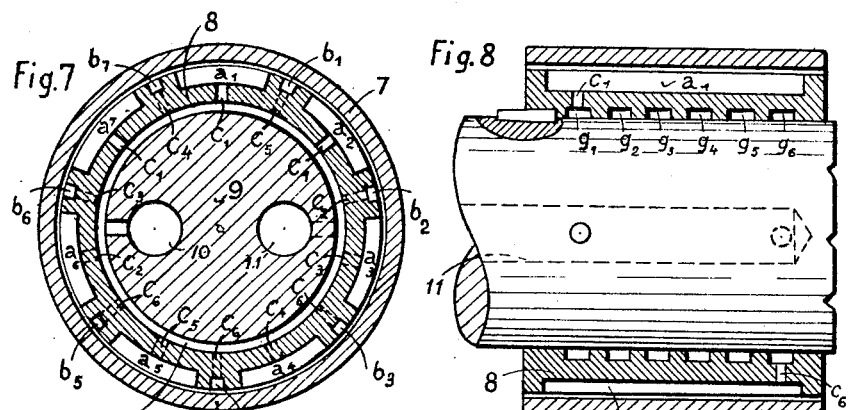
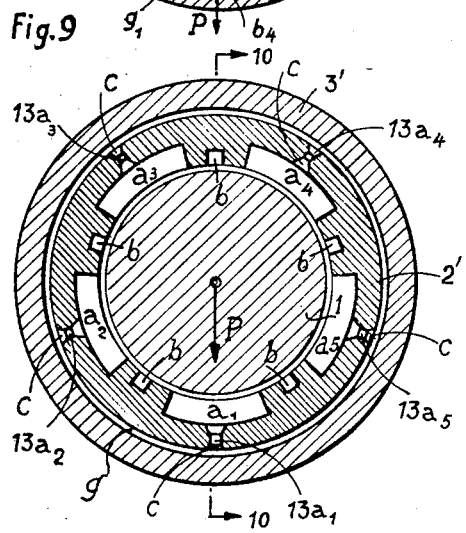
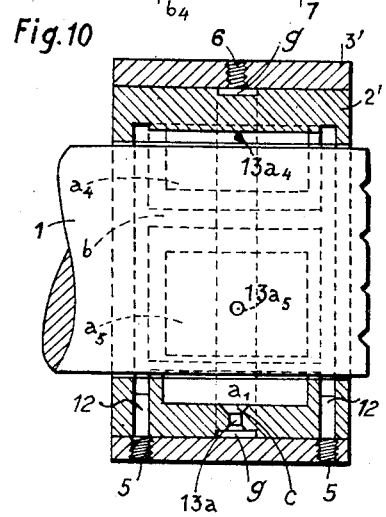
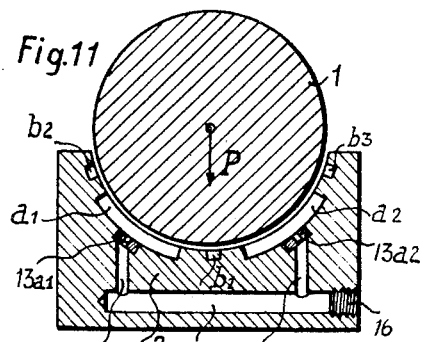
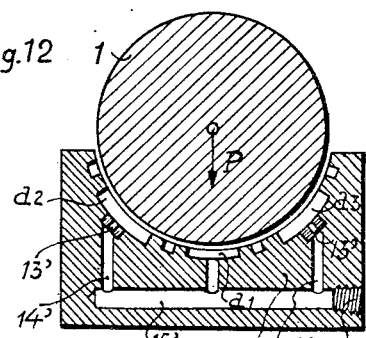
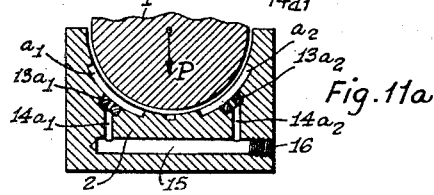
Inventor
Paul Louis Julien Gerard
by Brown & Seward
Attorneys Patented Nov. 24, 1953

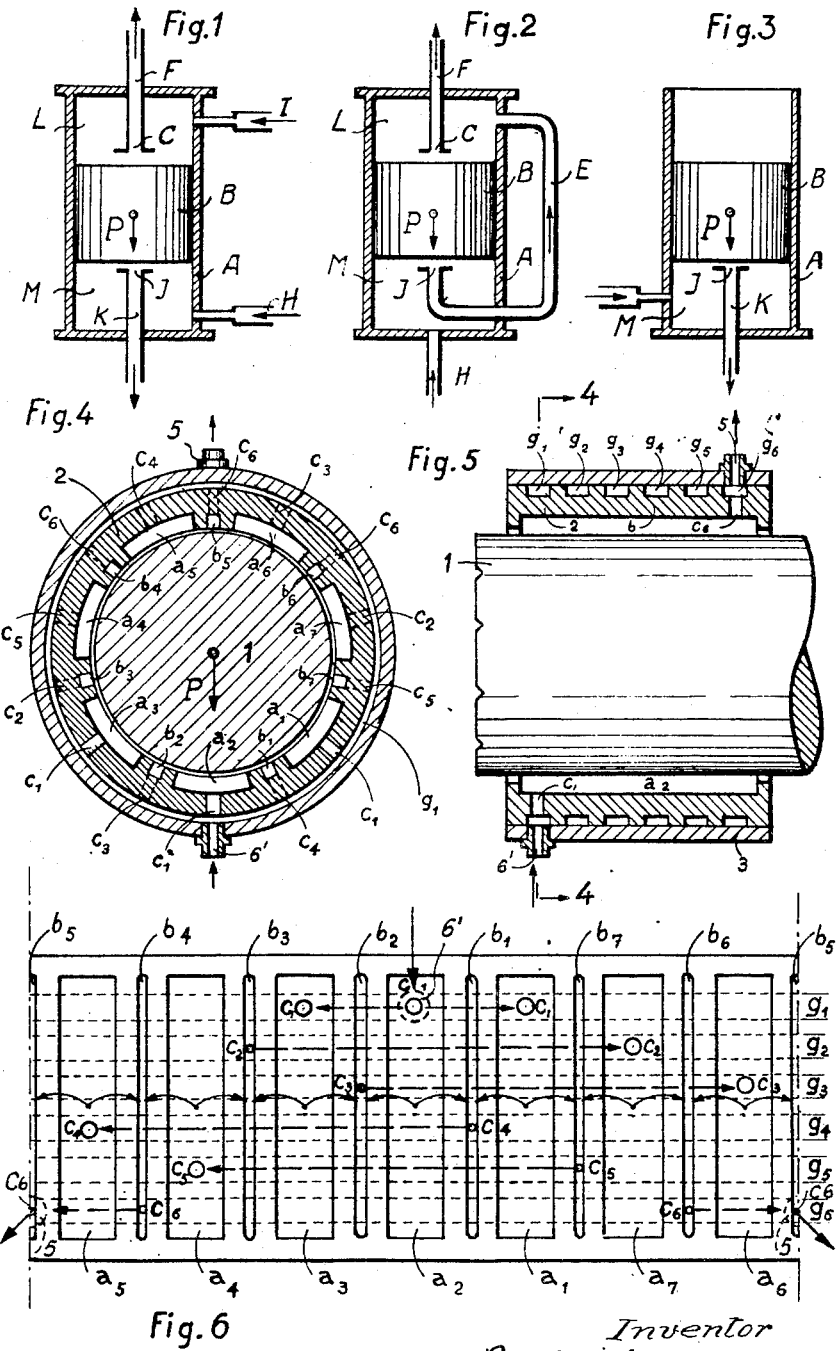

2,660,485

UNITED STATES PATENT OFFICE 2,660,485

FLUID SUPPORT

Paul Louis Julien Gerard, Paris, France

Application August 8, 1951, Serial No. 240,959
In France January 19, 1945

Section 1, Public Law 690, August 8, 1946
Patent expires January 19, 1965

11 Claims. (Cl. 308—9)

This invention relates to bearings and the like for supporting a rotatable element, in which pressure fluid is conducted to the bearing surface to maintain a clearance between the rotatable element and said bearing surface.

In known bearings of this kind, it has been proposed to separately conduct fluid at substantially uniform pressure to several circumferentially and regularly spaced recessed portions or chambers of the bearing surface, said fluid being evacuated through longitudinal grooves separating said recessed portions. This fluid spreads to maintain an annular clearance between the bearing surface and the movable element, thereby holding the movable element in a floating state, so that the same is positioned to maintain constant supporting clearance with the bearing surface, the relative displacement of the movable element toward a portion of the bearing surface automatically increasing fluid pressure in certain of the fluid receiving chambers to counteract the forces tending to cause said relative displacement.

Now, due to the fact that the fluid separately conducted to each of the circumferentially spaced fluid receiving chambers is at substantially uniform pressure in a manner to constitute uniform pressure or balancing zones symmetrically disposed around the floating element, it is easy to understand that a perfect concentric balance condition will only exist in the absence of any permanent external force, such as gravity, imposed upon the floating element.

On the contrary, any application of such a permanent force implies a different state of equilibrium of the pressures, which can be created only by the rotatable member itself. This implies a position of said rotatable member different to its concentric position which, besides being objectionable per se, requires, in order to ensure nevertheless the desired minimum clearance along the entire periphery and, in particular, in the zone of said periphery in which the rotatable member has been thus brought nearer the fixed member, a comparatively considerable increased average clearance. Now, in said known symmetric bearings, the pressure in the upper peripherical arc (assuming the permanent force applied to the rotatable member is gravity) resists partly the action of the pressure in the lower arc and this effect must be compensated by a general increase of pressure, which results in turn in a further increase of the rate of flow. Therefore, it is clear that with known symmetric bearing a very considerable amount of power is wasted.

One object of the invention is to provide an improved bearing structure avoiding the above mentioned drawbacks and capable of generating a predetermined resultant even when the rotatable element is centered.

Another object of the invention is to provide a bearing structure of the aforesaid type in which any shift of the rotatable member from its concentric position varies said resultant by a differential force which opposes said shift.

Other objects and advantages of the invention will be better understood with reference to the accompanying detailed description and the annexed drawings in which some embodiments of the invention have been represented as a mere illustration.

This application is a continuation-in-part of patent application Serial No. 699,051, filed September 24, 1946, now abandoned.

In these drawings:

Fig. 1 is an explanatory diagram showing the operation of a known fluid bearing having symmetrically arranged balancing zones fed with a uniform fluid pressure.

Fig. 2 is an explanatory diagram similar to Fig. 1, but showing the operation of a fluid bearing according to the invention.

Fig. 3 is a similar explanatory diagram showing the operation of a pillow-block bearing according to the invention.

Fig. 4 is a diametral section, along line 4—4 of Fig. 5, of a bearing according to the invention.

Fig. 5 is an axial longitudinal section of the said bearing.

Fig. 6 is a developed view showing the arrangement of the different zones and longitudinal grooves of the bearing according to Figs. 4 and 5.

Fig. 7 is a diametral section similar to Fig. 4, showing a pulley journalled on an axle through a bearing surface according to the invention.

Fig. 8 is an axial longitudinal section of said pulley.

Fig. 9 is a diametral section similar to Figs. 4 and 7, showing another embodiment of a bearing according to the invention.

Fig. 10 is an axial longitudinal section of the embodiment shown in Fig. 9.

Figs. 11, 11a and 12 are diametral sectional views of three embodiments of a shaft bearing according to the invention, extending only around the lower portion of said shaft.

In all figures, it has been assumed, to make the description clearer, that the rotatable member is subjected only to gravity which is indicated under the shape of arrow P. It is obvious that the construction and operation would be similar if any other permanent force or forces having a resultant of permanent direction and constant absolute value were to be compensated.

In the diagrammatical views of Figs. 1 to 3, the operation of the bearings will be explained with reference to a piston-cylinder system, in order to make said operation more easily understandable.

In these figures, the rotatable element to be supported has been shown in the shape of a free piston B slidably mounted in a cylinder A. Piston B is subjected to the force of gravity, as shown by arrow P.

Fig. 1 shows the operation of a known fluid bearing in which the symmetrically arranged balancing zones L and M are fed with a uniform pressure conducted thereinto through conduits I and H. The evacuation of the fluid from zones L and M takes place through conduits F and K, respectively. Piston B acts in the manner of a valve having two valve-seats constituted by ends C and J of conduits F and K, respectively.

It may be seen in Fig. 1 that it is impossible in such a system to provide a perfect static balance of piston B with a symmetric location with respect to valve-seats C and J when chambers L and M are fed with the same pressure.

Assuming the system is at rest, i. e. with no pressure. piston B will seat under the action of gravity P on end J, so that conduit K will be closed while conduit F will be fully opened. In order to bring piston B towards a symmetrical position between J and C, fluid under uniform pressure is conducted to both balancing zones L and M, so as to build up in zone M a pressure sufficient to overcome force P and to lift piston B off seat J. Meanwhile, the pressure fluid conducted into zone L escapes freely through conduit F, which results in a considerable consumption of fluid. Moreover, it will be clear that piston B cannot be brought into an absolute symmetrical position with reference to C and J, since if it were the pressures in zones L and M would be rigorously equal, which would imply since the feeding pressures are the same while the outlets would be also the same, that piston B exerts no pressure in zone M or, in other words, that piston B is not subjected to gravity which is the contrary of what has been assumed.

On the contrary, in the bearing according to the invention, diagrammatically shown in Fig. 2, only the lower chamber M of cylinder A is directly supplied with fluid under pressure through a conduit H, while the upper balancing zone L is fed through a conduit E interconnecting this zone with the lower zone M. It is clear that with this arrangement the pressure in zone M will be higher than the pressure in zone L and that piston B will be easily brought into an absolute symmetrical position between C and J by giving to the pressure difference between M and L a value equal and opposite to force P. Moreover, any shift of piston B, e. g. in upwards direction (on the figure), will cause a decrease of the output at F, an increase of the input at E and, consequently, a rise in the pressure in L. A shift of the piston B downwards would have corresponding opposite results.

In the case of Fig. 3, the upper end of cylinder A is open and is not subjected to any pressure fluid, so that it suffices to introduce into the lower zone M a pressure capable of overcoming force P to raise piston B and to open the end of the evacuation conduit K.

Referring now to Figs. 4 and 5, there is shown a bearing based on the principle shown in Fig. 2 and comprising a shaft 1 mounted in a bushing 2 which is received in its turn in a bearing 3.

In this example, there are provided on the inner periphery of the bushing 2 seven zones or recessed portions indicated by $a1$ to $a7$ and seven longitudinal grooves indicated by $b1$ to $b7$. In this example, zones $a1$, $a2$, $a3$ which constitute the supporting zones are supplied directly by passages $c1$ opening into a circular groove $g1$ provided on the outer periphery of bushing 2 and supplied with a fluid under pressure by an intake conduit 6'. Groove $b7$ is connected with diametrically opposite zone $a4$ by means of two passages $c5$ opening into an annular groove $g5$. Similarly, groove $b1$ is in communication with zone $a5$ by means of passages $c4$ opening into annular groove $g4$, the groove $b2$ is in communication with zone $a6$ by means of passages $c3$ and annular groove $g3$ and groove $b3$ is in communication with zone $a7$ by means of passages $c2$ and annular groove $g2$.

Finally, the upper grooves $b4$, $b5$, $b6$ are in communication by means of passages $c6$ with an annular groove $g6$ which is connected by an outlet orifice 5 to the discharge side of the system.

The different paths of the pressure fluid within the bearing of Figs. 4 and 5 will be easily followed with reference to the developed diagram of Fig. 6. In this diagram, the paths of the pressure fluid between the various supporting zones and between the longitudinal grooves and the balancing zones have been shown in dashed straight lines, while the paths of the pressure fluid between each zone and the two adjacent longitudinal grooves have been shown in the shape of curved arrows. The circulation is symmetrical on either side of supporting zone $a2$, so that it will be sufficient to indicate hereunder the path of the pressure fluid on one side thereof. This path is as follows: inlet 6', groove $g1$, passages $c1$, supporting zones $a1$ and $a2$; from supporting zones $a1$ and $a2$ into longitudinal groove $b1$; from supporting zone $a1$ into longitudinal groove $b7$; from longitudinal grooves $b1$ and $b7$, respectively through annular grooves G4, G5 into supporting zones $a5$ and $a4$; from balancing zone $a5$ into longitudinal grooves $b4$ and $b5$; from balancing zone $a4$ into longitudinal grooves $b4$ and $b3$; from longitudinal groove $b3$ through annular groove $g2$ into balancing zone $a7$; from balancing zone $a7$ into longitudinal grooves $b7$ and $b6$; from longitudinal groove $b7$ into balancing zone $a4$, as previously; from longitudinal grooves $b6$, $b4$ through annular groove $g6$ into longitudinal groove $b5$ and from longitudinal groove $b5$ through passage C6 to output 5.

The pressure in supporting zones $a1$, $a2$, $a3$, which are fed directly from inlet 6', is substantially constant and higher than the variable pressure in balancing zones $a4$ to $a7$, which are fed downstream. If the pressure difference is substantially equal and opposite to force P when shaft 1 is centered, force P will be compensated, the shaft being furthermore urged into a centered position by combined action of the pressure in all zones.

Referring now to Figs. 7 and 8, there is shown at 7 a pulley mounted on a sleeve 8 which is carried in turn by an axle or shaft 9.

There are provided on the outer periphery of sleeve 8 a series of pressure zones $a1$ to $a7$ and a series of longitudinal grooves $b1$ to $b7$. In this example, zones $a7$, $a1$, $a2$ are directly supplied through passages $c1$ opening into an annular groove $g1$ provided on the inner periphery of sleeve 8 and supplied with fluid under pressure by an inlet conduit 10.

Groove $b6$ is in communication with pressure zone $a3$, by means of passages $c3$ and the annular groove $g3$; groove $b7$ is in communication with zone $a4$ by means of passages $c4$ and the annular groove $g4$; groove $b1$ is in communication with zone $a5$ by means of passages $c5$ and the annular groove $g5$; groove $b2$ is in communication with zone $a6$ by means of passages $c2$ and the annular groove $g2$. Finally, the lower grooves $b3$, $b4$, $b5$ are connected by passages $c6$ with an annular groove $g6$ which is in communication with a discharge or evacuation conduit 11. The operation is exactly the same as in Figs. 4 and 5 except that force P urges now the upper portion of pulley 7 towards sleeve 8.

Referring to Figs. 9 and 10, there is shown at 1 a shaft mounted in a bushing $2'$ which is, in turn, received in a bearing $3'$. There are provided in the inner periphery of bushing $2'$ five zones $a1$ to $a5$ and five longitudinal grooves $b$. In this embodiment, zones $a1$ to $a5$ are supplied with pressure fluid by means of passages $c$ having nozzles $13a1$ to $13a5$ of different cross-sections opening into an annular groove $g$ provided on the outer periphery of the bushing $2'$ and supplied with fluid under pressure through an inlet conduit 6. The longitudinal grooves $b$ open at both ends into annular grooves 12 provided in the inner periphery of bushing $2'$. Each of grooves 12 communicates with a discharge or evacuation conduit 5. Now, nozzles $13a1$ to $13a5$ have each a cross-section such that the resultant of the pressures in zones $a2$, $a1$ and $a5$ is higher than the resultant of the pressure in zones $a3$, $a4$ by a value equal and opposite to force P. In the example shown, the nozzles $13a2$ and $13a5$ are of more restricted cross-section than nozzle $13a1$, while nozzles $13a3$, $13a4$ are of still smaller cross-section than nozzles $13a2$, $13a5$.

With this arrangement, a maximum loss of pressure will be produced by the upper nozzles $13a3$ and $13a4$, the loss of pressure through nozzles $13a2$ and $13a5$ being lower, while said loss of pressure will have its minimum value through nozzle $13a1$. Thus, the weight of shaft 1 will be compensated by the pressure difference between the lower and higher zones.

In the embodiments of Figs. 11 and 12, the bearing is of the pillow-block type. The bearing surface which, in the examples shown in Figs. 11 and 12, is substantially semi-cylindrical, is provided with supporting zones symmetrically distributed with respect to the vertical plane of symmetry of the bearing.

In the embodiment of Fig. 11, two supporting zones $a1$ and $a2$ of this type are provided one on either side of said axis on which is located a longitudinal groove $b1$ separating said zones and collecting the pressure fluid therefrom. Said zones are fed in parallel, through nozzles $13a1$ and $13a2$ and ducts $14a1$ and $14a2$ communicating with a feeding duct 15 having an inlet 16. In the example shown, two other longitudinal grooves $b2$ and $b3$ are provided on either side of the assembly described above, constituted by zone $a1$, longitudinal groove $b1$ and zone $a2$, to collect the pressure fluid escaping from zones $a1$ and $a2$, respectively, on the sides opposite groove $b1$.

In this arrangement, the resultant of the symmetrical radial pressure forces exerted by zones $a1$ and $a2$ is a vertical radial force opposite to the gravitational force P which extends along the same axis.

Therefore, if said resultant is equal to said gravitational force, the latter will be compensated and shaft 1 will be supported in a floating state, i. e. without any metal-to-metal contact with the bearing.

In the alternative embodiment shown in Fig. 12, three supporting zones $a1$, $a2$, $a3$ are provided, the vertical plane of symmetry passing substantially in the middle of zone $a1$ of the bearing. The two other zones $a2$ and $a3$ are located symmetrically with respect to $a1$ and are fed through nozzles $13'$ and ducts $14'$ from a duct $15'$ communicating with an inlet $16'$. The additional zone $a1$ adds its effect to the resultant of both other zones and since it is fed as shown at $14'$, in parallel from duct $15'$ but without passing through any nozzle, it will be easy to design the whole assembly so that the final resultant of the three forces is substantially equal and opposite to the force to be compensated.

In the embodiment of Figs. 11, 11a and 12 the evacuation of the fluid from the longitudinal grooves towards a low pressure zone has not been shown. As a matter of fact, since the bearing does not surround entirely the shaft, the free portion constitutes a lower pressure zone in itself. Evacuation ducts, such as shown in the other embodiments, may be also provided, or the upper discharge grooves (for instance $b2$ and $b3$ in Fig. 11) may be omitted, as in Fig. 11a.

In all above described bearings, the evacuation of each zone takes place along the whole of its perimeter, that is to say, the fluid spreads in all directions but cannot flow from one of zones $a$ into another since these zones are separated by the discharge grooves $b$. The presence of grooves $b$ improves greatly the efficiency of the bearing. This makes it possible to reduce the dimensions of the bearing.

It is to be understood that various changes can be made in the arrangement suggested without departing from the scope of the invention.

What is claimed is:

1. A bearing structure comprising a fixed member, a rotatable member concentric and interfitting therewith with a clearance therebetween and subjected to substantially constant external forces acting in a direction radial to said members, seven circumferentially equally spaced recessed portions in the bearing surface of said fixed member, one of said recessed portions being so located that the resultant of said external forces passes substantially in the middle thereof, means to conduct fluid under pressure to said recessed portion and the two recessed portions located on either side thereof, longitudinal grooves separating each one of said recessed portions from the next one, means to conduct fluid under pressure from each of the four longitudinal grooves adjacent to said three recessed portions to the recessed portion diametrically opposite each said groove and means to evacuate said fluid towards a low pressure zone from the three other grooves.

2. A bearing structure according to claim 1 in which said rotatable member is journalled in said fixed member.

3. A bearing structure according to claim 1 in which said rotatable member is rotatably mounted on said fixed member.

4. A bearing structure comprising a shaft, a sleeve concentric with said shaft and interfitting therewith with a clearance therebetween, a plurality of circumferentially spaced chambers in the bearing surface of said sleeve, longitudinal grooves disposed between said chambers, means to conduct fluid under pressure to certain chambers including an annular groove formed in the outer surface of said sleeve, means to discharge said fluid from certain longitudinal grooves including an annular groove formed in the outer surface of said sleeve and means to conduct said fluid from certain longitudinal grooves to certain chambers including a given number of annular grooves formed in the outer surface of said sleeve.

5. A bearing structure comprising a fixed pillow-block, a shaft journalled in said pillow-block with a clearance therebetween, said shaft being acted upon by gravity, two angularly spaced recessed portions arranged symmetrically with respect to the vertical radial plane of said shaft, means to conduct pressure fluid to said recessed portions and three longitudinal grooves in said bearing surface, one of which is located between said recessed portions and equally spaced therefrom, while the other two are located on either side of the assembly, comprising said recessed portion and said longitudinal grooves to evacuate said fluid from said recessed portions towards a low pressure zone, said pressure fluid conducting means being so designed that the pressure in said recessed portions is capable of balancing the action of gravity upon said shaft.

6. A bearing structure according to claim 5 in which said means to conduct pressure fluid to said recessed portions include nozzles.

7. A bearing structure according to claim 5 in which said other two longitudinal grooves are omitted.

8. A bearing structure comprising a fixed pillow-block, a shaft journalled in said pillow-block, with a clearance therebetween, said shaft being acted upon by gravity, a first recessed portion so located that the vertical diametral plane of said movable member passes substantially in the middle thereof and two other recessed portions arranged symmetrically on either side of said first recessed portion, means to conduct said pressure fluid unrestrictedly to said first recessed portion, means, including nozzles, to conduct fluid under pressure to both said other recessed portions and longitudinal grooves in said bearing surface on either side of said recessed portions to evacuate said fluid therefrom towards a low pressure zone, said fluid pressure conducting means being so designed that the pressure in said first recessed portion and in said other recessed portions has a resultant equal and opposite to the force of gravity acting upon said shaft.

9. A bearing structure comprising a shaft, a sleeve concentric with said shaft and interfitting therewith with a clearance therebetween, said shaft being subjected to substantially constant external forces having a resultant in a direction radial to said shaft, a plurality of circumferentially spaced chambers in the bearing surface of said sleeve, longitudinal grooves disposed between said chambers, a first annular groove formed in the outer surface of said sleeve, means to conduct fluid under pressure to said annular groove, at least one nozzle between each of said chambers and said first annular groove, said nozzles being so designed as to create in said clearance a pressure having a resultant opposite to said external force resultant, at least one other annular groove formed in said sleeve and means to evacuate fluid under pressure from said longitudinal grooves into said other annular groove and from the latter to a lower pressure zone.

10. A bearing structure comprising a fixed member, a rotatable member concentric and interfitting therewith with a clearance therebetween and subjected to substantially constant external forces acting in a direction radial to said members, an odd number of circumferentially equally spaced recessed portions in the bearing surface of said fixed member, one of said recessed portions being so located that the resultant of said external forces passes substantially in the middle thereof, means to conduct fluid under pressure to the recessed portions located on the same side as said external force resultant of the diametral plane of said fixed member right-angled to said resultant, longitudinal grooves separating each one of said recessed portions from the next one, means to conduct fluid under pressure to each other recessed portion from the longitudinal groove diametrically opposite the same and means to evacuate said fluid towards a lower pressure zone from the other longitudinal grooves.

11. A bearing structure comprising a fixed member, a rotatable member concentric and interfitting therewith with a clearance therebetween, an odd number of circumferentially spaced chambers in the bearing surface of said fixed member, longitudinal grooves disposed between said chambers, means to conduct pressure fluid to certain chambers, means to conduct pressure fluid from the longitudinal grooves adjacent said certain chambers to the other chambers, and means to evacuate pressure fluid from the other longitudinal grooves towards a lower pressure zone.

PAUL LOUIS JULIEN GERARD.

References Cited in the file of this patent

UNITED STATES PATENTS

| Number | Name | Date |
|---|---|---|
| 2,578,712 | Martellotti | Dec. 18, 1951 |